United States Patent [19]

Boyd

[11] Patent Number: 5,062,511
[45] Date of Patent: Nov. 5, 1991

[54] BRAKE ACTUATOR FOR BICYCLES AND THE LIKE

[76] Inventor: Winnett Boyd, 107 Victoria Place R.R. No. 1, Bobcaygeon, Ontario, Canada, K0M 1A0

[21] Appl. No.: 644,384

[22] Filed: Jan. 22, 1991

[51] Int. Cl.⁵ ............................................. F16D 41/24
[52] U.S. Cl. ...................................... 192/5; 192/8 C; 192/415; 188/24.17; 188/82.6
[58] Field of Search .................... 192/5, 6 B, 8 C, 415; 188/24.17, 77 W, 82.6

[56] References Cited

U.S. PATENT DOCUMENTS

| | | | |
|---|---|---|---|
| 1,488,714 | 4/1924 | Schürmann | 192/5 |
| 2,075,567 | 3/1937 | Benedek | 192/8 C X |
| 3,897,857 | 8/1975 | Rodaway | 188/77 W X |
| 4,199,046 | 4/1980 | Boyd | 188/82.6 X |
| 4,246,991 | 1/1981 | Oldakowski | 192/8 C |
| 4,313,530 | 2/1982 | Boyd | 192/415 |
| 4,603,764 | 8/1986 | Boyd | 188/24.17 X |
| 4,605,110 | 8/1986 | Boyd | 188/82.5 X |
| 4,825,988 | 5/1989 | Nishimura | 192/415 X |
| 4,905,803 | 3/1990 | Boyd | 192/5 |
| 4,986,400 | 1/1991 | Heller | 192/415 X |

Primary Examiner—Leslie A. Braun
Assistant Examiner—Nicholas Whitelaw
Attorney, Agent, or Firm—Ridout & Maybee

[57] ABSTRACT

In a brake actuator for bicycles of the type housed within the bottom bracket of the bicycle, an actuating lever passing through the bottom bracket has a head housed within a slot within an annulus surrouding the pedal crankshaft of the bicycle within the bottom bracket. The annulus is provided with a torque spring providing a clutching action which tends to rotate the annulus with the crankshaft upon backpedalling. The lever acts upon bearing surfaces at opposite ends of the slot in the annulus, responsive to rotation of the latter, so as to exert a clamping action on the crankshaft between the lever and the annulus. The arrangement may be made sufficiently compact that it can be assembled into bicycles having small diameter bottom brackets. The slot and head of the lever are configured so that the lever head may be inserted through the bottom bracket and the slot from the outside, and then locked in place by insertion of the crankshaft.

3 Claims, 1 Drawing Sheet

BRAKE ACTUATOR FOR BICYCLES AND THE LIKE

BACKGROUND OF THE INVENTION

1. Field of the Invention

This invention relates to brake actuating means for pedal propelled vehicles such as bicycles. Although the invention is also applicable to pedal propelled vehicles having more than two wheels, e.g. tricycles, it will for convenience hereinafter be explained and described in relation to bicycles, which are by far the most common form of such vehicles, without thereby implying any limitation of the scope of the invention to bicycles.

2. Review of the Art

This invention relates to a development of the brake actuating means described in my U.S. Pat. Nos. 4,199,046, 4,313,530, 4,905,803, 4,603,764 and 4,605,110, which are the most pertinent art known to me, particularly the last two patents listed. A further impression of the state of the art relating to actuators of the same general type may be obtained by considering the references discussed in the specifications of those patents are cited during their prosecution.

In the actuators described in my U.S. Pat. Nos. 4,199,046, 4,313,530 and 4,905,803, a one-way clutch element acting on the pedal crankshaft of a bicycle is formed by a spiral coil spring having a central bight engaging a yoke through which braking forces are transmitted, and oppositely handed spiral coils surrounding the crankshaft and extending axially outward along the crankshaft from opposite sides of the yoke. Outward portions of the coils are of relatively lighter gauge and are normally the only portions to engage the crankshaft, thus reducing frictional drag. Development has shown that this arrangement can operate very satisfactorily with very little drag during forward pedalling of the bicycle whilst requiring very little rearward angular motion of the pedals to produce engagement.

Much thought has been given to alternatives to this spring type brake actuator as described in the above patents. For those North American manufactured bicycles that have large bottom brackets (approximately 2 inches inside diameter), my U.S. Pat. Nos. 4,603,764 and 4,605,110 provide alternatives to the above coil type brake actuator. In those patents, there is disclosed a device for operating a brake of a pedal operated vehicle, comprising a brake operating lever projecting through an opening in a pedal crankshaft housing of the vehicle and having an inner end forming a first primary clutch element engageable with part of the circumference of a pedal crankshaft within the housing, a pilot clutch comprising two oppositely wound spring coils connected by a bight engaging a yoke the bight ends of the coils being directed in the direction of forward rotation of the crankshaft, the inner end of the lever having an end extending around the crankshaft circumference in the opposite direction to said yoke, means extending from the said end of the lever and wrapping around the crankshaft so as to form a second primary clutch element engageable with the circumference of the crankshaft at least in a zone opposite to that engageable by the lever, and means transmitting forces from the yoke to the distal end of said first primary clutch portion whereby to wrap the latter onto the crankshaft upon rearward motion of the crankshaft. The linkage in one preferred embodiment comprises a single link pivoted to the yoke in a C-formation, although alternative linkage may be formed by multiple links, a resilient strap, or a strap fastened at both ends to the yoke. In each case, the yoke in conjunction with the linkage provides, on movement of the crankshaft in one direction relative to the yoke, a self-servo effect, causing the shaft to be gripped between the yoke and the jaw, the latter being pulled into engagement with the shaft by the spring. The flexibility of the linkage means that the device can be manipulated to reduce its size during assembly of the actuator into the bottom bracket of the bicycle.

Unfortunately, because of the space limitations in the pedal crankshaft housings formed by the small bottom brackets of non-North American manufactured bicycles, I have not hitherto been able to devise any alternative of comparable performance to my earlier spring type actuator for such bicycles, since it is difficult to assemble and to attain adequate strength in arrangements of the type shown in my U.S. Pat. Nos. 4,603,764 and 4,605,110 if they are utilized with such bicycles.

SUMMARY OF THE INVENTION

A primary object of the present invention is to provide a brake actuator working on somewhat similar general principles to those disclosed in my U.S. Pat. Nos. 4,603,764 and 4,605,110 which is more suitable for installation in a bicycle having a small diameter bottom bracket. In such bicycles the annular gap within the bracket between the inside surface of the bracket and the outside surface of the pedal crankshaft is insufficient to permit the use of a pin jointed, C-clamp type actuator as described in my U.S. Pat. No. 4,603,764, because dimensional limitations on the pin joint and the C-clamp would result in them being too weak for the forces that may be applied to them during operation. Similar considerations would stand in the way of the adoption in such a bicycle of the alternative embodiments described in my U.S. Pat. Nos. 4,603,764 and 4,605,110.

I have now determined that a brake actuator having the generic features set forth above in relation to my U.S. Pat. Nos. 4,603,764 and 4,605,110 can be installed in a small diameter bottom bracket, if the second primary clutch element is formed by a major peripheral portion of an annulus surrounding the pedal crankshaft within the pedal crankshaft housing, and the first primary clutch element is received within an arcuate slot through a remaining peripheral portion of the annulus, bearing surfaces on the annulus at opposite ends of said arcuate slot providing respectively the means transmitting forces from the yoke to the distal end of the primary clutch portion, and a fulcrum for engagement by a proximate end of said primary clutch portion, such that the pedal crankshaft can be clamped between the primary clutch portion and the secondary clutch element.

Since the primary clutch element is formed as a continuous annulus, whose axial extent can be as great as necessary, and no pivot pin is required to connect the primary and secondary clutch portions, a very strong assembly can be provided even where the space between the crankshaft and the bottom bracket is very limited.

Preferably the arcuate slot and the inner end of the lever have configurations such that, when the first and second clutch elements are substantially concentric, the inner end of the lever cannot be withdrawn outwardly through the slot, but when the crankshaft is not present, the inner end of the lever can be manipulated inwardly through the slot. This feature greatly facilitates assembly of the actuator, since the lever can be inserted through the slot into the annulus after insertion of the latter into the bottom bracket, at which time it can be projected through the opening in the bottom bracket and the slot, and then locked in place by insertion of the crankshaft.

Further features of the invention will become apparent from the following description of a preferred embodiment.

SHORT DESCRIPTION OF THE DRAWINGS

DESCRIPTION OF THE PREFERRED EMBODIMENT

Figure 1:
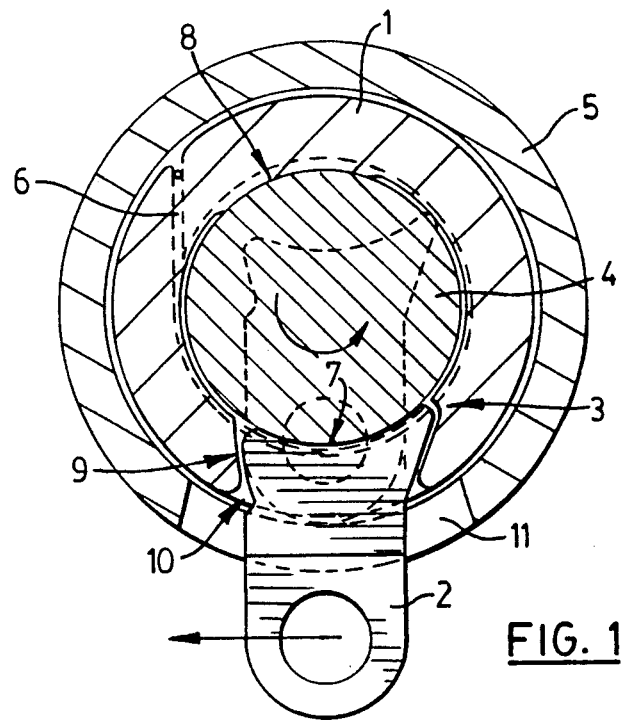
FIG. 1 is a vertical cross section through the bottom bracket of a bicycle, showing essential parts of the invention, on the line 1—1 in FIG. 2.
Figure 2:
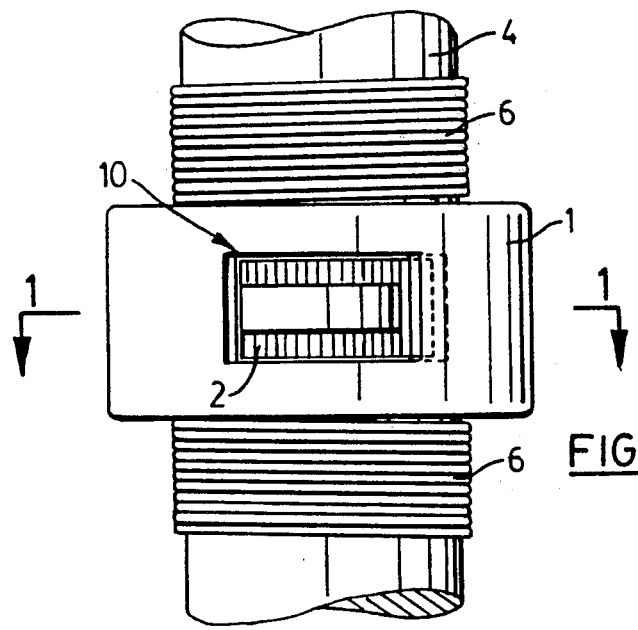
FIG. 2 is a fragmentary view of part of the pedal crankshaft of the bicycle, showing components of the brake actuator assembled to it.

In the actuator of the present invention, the annulus 1 replaces the C-clamp disclosed in the actuator described in my U.S. Pat. No. 4,603,764, the disclosure of which is herein incorporated by reference. Lever 2 serves the same purpose as its counterpart in my previous patent, although fulcrum 3 formed at one end of a slot 10 in the ring 1 replaces the pin joint of my previous patent. The pedal crankshaft 4, bottom bracket 5 and double torsion spring 6 are similarly constructed and have similar functions to the corresponding parts in my previous patent, although the radial spacing between the external diameter of the shaft 4 and the internal diameter of the bottom bracket or crankshaft housing 5 need not be as great. A further bearing surface 9 is formed between the lever 2 and the opposite end of the slot 10 in the annulus. The lever 2 extends through a slot 11 in the bracket 4.

Figure 3:
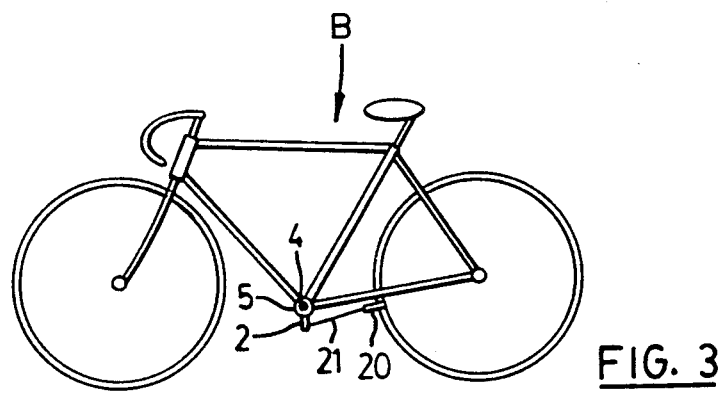
FIG. 3 is a diagrammatic side elevation of a bicycle incorporating the invention.

In use, when the rider of a bicycle B (See FIG. 3) to which the actuator is applied back pedals and turns the shaft 4 in a counter clockwise direction, the double torsion spring 6 grips the shaft 4 and turns the annulus 1 in a counter clockwise direction as shown in FIG. 1. This moves lever 2 from left to right which movement is resisted by a brake linkage 21 that is attached to the lower end of lever 2 and to a brake 20 (See FIG. 3). This resistance results in lever 2 pivoting about fulcrum 3 and thus causing the shaft 4 to be gripped between an arcuate surface 7 on the inner end of the lever forming a primary clutch element and an arcuate surface 8 forming a secondary clutch element on the inner periphery of the annulus 1 opposite the surface 7. The torque from the crankshaft 4 is thus transmitted to the annulus 1 and the lever 2 through the surfaces 7 and 8, as well as the fulcrum 3 and a bearing surface 9 between the annulus 1 and the lever 2 at the opposite end of the slot 10.

In one approach to assembly of the arrangement described above, the lever 2 is assembled into the annulus 1 by inserting it from the bottom (referring to the orientation shown in FIG. 1) through the slot 10, and pushing it up to the position shown in broken lines in FIG. 1 so that the annulus 1, together with the lever 2 and the double torsion spring 6 may be inserted into the bottom bracket 5. The lower end of the lever 2 is then lowered through the slot 10 and the opening 11 in the bottom bracket 5 and held in place whilst the crankshaft 4 is passed through the annulus 1 and the double torsion spring 6. The head of the lever and the slot 10 are configured so that the head of the lever cannot be withdrawn outwardly through the slot once the primary and secondary clutch elements are retained in substantially concentric relationship by the crankshaft 4. The lever is thus retained within the slot 10 once the crankshaft 4 is in place. The lever is somewhat necked adjacent its inner end so that the latter can be manipulated inwardly through the slot 10 when the crankshaft is not in place.

In a much preferred assembly technique, permitted by the improvements of the present invention, the annulus 1 and spring 6 are placed in the bottom bracket 5 prior to insertion of the lever, with the slot 10 aligned with the opening 11. The head of the lever 2 is then manipulated through the opening and the aligned slot from the outside before being locked in place by insertion of the crankshaft. This both simplifies assembly, and also provides the advantage that the length of the lever is not limited by any requirement that it fit within the annulus during insertion of the latter.

The annulus 1 can be reduced in width over that portion of its periphery which does not contain the slot 10, in order to reduce its weight. The extent of this reduction is limited by the necessity for keeping deformation of the annulus 1 under load sufficiently low to enable proper operation within the space available. The annulus should also have sufficient width in the region of the slot 10 so as to form a dirt shield resisting the entry of dirt into the interior of the bottom bracket 5 through the opening 11. Any local reduction of the width of the annulus must be such that a bight of the spring 6 can engage the yoke shown in the annulus without the spring being unduly stressed by contact with other portions of the annulus.

Whilst the arrangement described has particular utility in relation to bicycles having a small diameter bottom bracket, there is of course no reason why it may not be used in bicycles having a larger diameter bottom bracket.

I claim:

1. In a device for operating a brake of a pedal operated vehicle, comprising a brake operating lever projecting through an opening in a pedal crankshaft housing of the vehicle and having an inner end forming a first primary clutch element engageable with part of the circumference of a pedal crankshaft within the housing, a pilot clutch comprising two oppositely wound spring coils connected by a bight engaged in a yoke, the bight ends of the coils being directed in the direction of forward rotation of the crankshaft, the inner end of the lever having an end extending around the crankshaft circumference in the opposite direction to said yoke, means extending from the said end of the lever and wrapping around the crankshaft so as to form a second primary clutch element engageable with the circumference of the crankshaft at least in a zone opposite to that engageable by the lever, and means transmitting forces from the yoke to a distal end of said first primary clutch portion whereby to wrap the latter onto the crankshaft upon rearward motion of the crankshaft, the improvement wherein:

the second primary clutch element is formed by a major peripheral portion of an annulus surrounding the pedal crankshaft within the pedal crankshaft housing, and the first primary clutch element is received within an arcuate slot formed through a remaining peripheral portion of the annulus, bearing surfaces on the annulus at opposite ends of said arcuate slot providing respectively the means transmitting forces from the yoke to the distal end of the primary clutch portion, and a fulcrum for engagement by said inner proximate end of the primary clutch portion, such that the pedal crankshaft can be clamped between the primary clutch element and the secondary clutch element.

2. A device as claimed in claim 1, wherein the arcuate slot and the inner end of the lever have configurations such that, when the first and second clutch elements are substantially concentric, the inner end of the lever cannot be withdrawn outwardly through the slot, but when the crankshaft is not present, the inner end of the lever can be manipulated inwardly through the slot.

3. A device as claimed in claim 2, wherein the inner end of the lever can be manipulated inwardly through the opening in the crankshaft housing and the slot when the slot is aligned within the opening.

* * * * *